US012411961B2

(12) United States Patent
Jaquette

(10) Patent No.: US 12,411,961 B2
(45) Date of Patent: Sep. 9, 2025

(54) USE OF 'TYPE' ENCRYPTION KEYS WITH KEY PER IO-ENABLED DEVICES

(71) Applicant: International Business Machines Corporation, Armonk, NY (US)

(72) Inventor: Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 18/208,149

(22) Filed: Jun. 9, 2023

(65) Prior Publication Data

US 2024/0411901 A1    Dec. 12, 2024

(51) Int. Cl.
*G06F 21/60* (2013.01)
*G06F 21/62* (2013.01)
*G06F 21/64* (2013.01)

(52) U.S. Cl.
CPC ........ *G06F 21/602* (2013.01); *G06F 21/6209* (2013.01); *G06F 21/64* (2013.01); *G06F 2221/2143* (2013.01)

(58) Field of Classification Search
CPC .... G06F 21/602; G06F 21/6209; G06F 21/64; G06F 2221/2143
See application file for complete search history.

(56) References Cited

U.S. PATENT DOCUMENTS

| | | |
|---|---|---|
| 11,563,570 B2 | 1/2023 | Benisty et al. |
| 11,641,276 B2 | 5/2023 | Benisty et al. |
| 2021/0083858 A1 | 3/2021 | Jaquette |
| 2021/0377017 A1* | 12/2021 | Benisty ................ G06F 21/602 |
| 2022/0029793 A1 | 1/2022 | Kachare et al. |
| 2022/0191019 A1* | 6/2022 | Jaquette ............... H04L 9/0861 |

FOREIGN PATENT DOCUMENTS

| | | |
|---|---|---|
| TW | 200731224 A | 8/2007 |
| TW | 201203092 A | 1/2012 |
| TW | 202449639 A | 12/2024 |
| WO | 2024/251556 A1 | 12/2024 |

OTHER PUBLICATIONS

Suhler et al., "Verifying SSD Sanitization," Presentation, NVM Express Developers Day, May 1, 2018, 16 pages.
Kissel et al., "Guidelines for Media Sanitization," NIST Special Publication 800-88, Revision 1, Dec. 2014, 64 pages.
(Continued)

*Primary Examiner* — Ayoub Alata
(74) *Attorney, Agent, or Firm* — Zilka-Kotab, P.C.

(57) ABSTRACT

A device-implemented method, in accordance with one aspect of the present invention, includes receiving a command having an address field of predefined length. A first subset of bits in the address field identify an external key of a particular tenant, and a second subset of the bits in the address field corresponds to one of a plurality of type keys associated with different data types. The external key identified by the first subset of bits is retrieved. The type key corresponding to the second subset of bits is also retrieved. The tenant and type keys are combined to create a combined key for use in encrypting and/or decrypting data associated with the command.

25 Claims, 7 Drawing Sheets

(56) References Cited

OTHER PUBLICATIONS

Rubin et al., "Data Security by using the System Erase feature of iDRAC9 on PowerEdge servers," Dell EMC, 2020, 1 page.
Apacer, "Trusted Computing Group Opal (TCG Opal), " Apacer Technology Inc. White Paper, Version 1.2, Dec. 18, 2018, 12 pages.
Anonymous, "Securely Extending Boot ROM Storage using Processor SEEPROM," IP.com Prior Art Database, Technical Disclosure No. IPCOM000266760D, Aug. 17, 2021, 5 pages.
Anonymous, "IOQ-Based Differential Security Model for NVMe Storage System," IP.com Prior Art Database, Technical Disclosure No. IPCOM000265704D, May 7, 2021, 6 pages.
Jaquette, G., U.S. Appl. No. 17/122,956, filed Dec. 15, 2020.
Jaquette et al., U.S. Appl. No. 16/808,174, filed Mar. 3, 2020.
Naser, M., "NVMe Storage—Understanding the Protocol That Redefines Storage Architecture," VEXXHOST, Inc., Oct. 29, 2020, 7 pages, retrieved from https://vexxhost.com/blog/nvme-storage-protocol-basics/.
Anonymous, "Generating cryptographic initialization vectors from SSD wear metrics," IP.com Prior Art Database, Technical Disclosure No. IPCOM000256595D, Dec. 13, 2018, 5 pages.
Taiwan Patent Office, "Office action," Jan. 15, 2025, 11 Pages, TW Application No. 113111430.
International Search Report and Written Opinion from PCT Application No. PCT/EP2024/064575, dated Sep. 3, 2024, 12 pages.

* cited by examiner

USE OF 'TYPE' ENCRYPTION KEYS WITH KEY PER IO-ENABLED DEVICES

BACKGROUND

The present invention relates to Key Per IO, and more specifically, this invention relates to the techniques and systems enabling designation of a type of key for use with Key per IO-enabled devices.

Modern data centers may employ Encryption-Capable Drives (ECDs). ECDs are encryption-capable whether they are of the self-encrypting drive (SED) type, and regardless of the storage technology (e.g. solid state drives (SSDs), hard disk drives (HDDs), hybrid drives comprised of both solid-state and hard-disk technology, or alternative non-volatile storage technology drives).

Data on ECDs may be encrypted and decrypted using a Media Encryption Key (MEK), which may be simply a unique key created for a given tenant, or created by combining an encryption key of the ECD with the unique encryption key created for a given tenant, where a tenant may be an individual, a server, a virtual machine (VM), a container, etc. In this way, each particular tenant storing data on a shared ECD cannot gain access to the data of other tenants.

The term "crypto-erase" generally refers to destroying or permanently disabling access to the encryption key needed to unencrypt data in some way. This can be done, for example, by erasing all copies of the encryption key, removing a portion of the encryption key, disabling access to an associated key required to generate or unwrap the encryption key, etc. By permanently disabling the encryption key, the data encrypted with that encryption key cannot be decrypted; the encrypted data is effectively rendered unencryptable.

Crypto-erase may be performed at the drive level—e.g. by permanently disabling all copies of the encryption key used by the drive for all data stored thereon. Crypto-erase may be performed at the user level—e.g. by permanently disabling the user's encryption key. However, disabling the user's encryption key renders all data pertaining to that user unreadable.

A problem is that encrypting devices can often only simultaneously handle a subset of the number of keys required to give adequate granularity for all desired kinds of cryptographic delete. One example of this is the Key Per IO standard being developed by the Trusted Computing Group's Storage Working Group's Key per IO (KPIO) subgroup.

KPIO currently allows a 16-bit NVMe header field to specify which key should be used to encrypt and/or decrypt a given host write and/or read. This potentially allows for a KPIO-compliant ECD or other KPIO-compliant encryption device to handle up to $2^{16}=65,536$ keys simultaneously. Each of these keys may be thought of as an external key (Kext) of a corresponding tenant, and will be referred to as such here. However, most KPIO-compliant ECDs (whether HDDs or SSDs) will actually only be able to hold and/or handle at most a few thousand keys simultaneously. For example, it is estimated that a state of the art KPIO-compliant ECD can hold at most 4,096 different keys.

Those 4,096 keys could be used to simultaneously accommodate 4,096 different tenants. But imagine that each of those tenants handles different types of data, for example, data having different levels of confidentiality, or data having different levels from a privacy point of view, or data related to different projects that are to be kept compartmentalized from one another.

For the present example, assume there are 16 different types of data a given tenant is able to handle. To allow all of a given type of data to be cryptographically erased independently, for all tenants, one would have to start assigning multiple keys per tenant. In the given example, one would need to use up to 16 keys per tenant to allow independent encryption of up to 16 different types of data. Such assignment of multiple keys would quickly use up the available key space. If a given KPIO compliant device can only simultaneously hold 4,096 different keys, and has to hold up to 16 keys per tenant, then that device could only accommodate 4,096/16=256 different tenants.

While trade-offs could be made (e.g. by restricting the number of types of data down to 8 to allow a device capable of handling 4,096 keys to accommodate up to 512 tenants), the more types of data accommodated directly reduces the number of tenants which can be handled by the device.

SUMMARY

A device-implemented method, in accordance with one aspect of the present invention, includes receiving a command having an address field of predefined length. A first subset of bits in the address field identify an external key of a particular tenant, and a second subset of the bits in the address field corresponds to one of a plurality of type keys associated with different data types. The external key identified by the first subset of bits is retrieved. The type key corresponding to the second subset of bits is also retrieved. The tenant and type keys are combined to create a combined key for use in encrypting and/or decrypting data associated with the command.

The foregoing methodology enables a device capable of simultaneously handling a smaller number of keys to accommodate a number of tenants about equal to the smaller number of keys, while also enabling use of unique keys for different data types for each of the tenants, as if the device were capable of handling many times as many keys. The methodology also enables such things as crypto-erase of a particular type of data for all tenants, as described in more detail below.

The data types may include privacy types, confidentiality types, etc. As noted above, the methodology now enables use of particular keys for such data types.

In one preferred approach, the command is a Non-Volatile Memory Express (NVMe) compliant command. The present methodology enables use of an NVMe command for specifying type keys.

The device may be configured as a Key per IO-enabled device. The present methodology provides new capabilities for KPIO-enabled devices.

In one approach, the method includes accessing an internal key stored within the device, generating a unique media encryption key using the internal key and the combined key, and using the media encryption key to encrypt and/or decrypt data associated with the command. This feature adds a further layer of security in that the internal key would be needed to access the data stored on the device. Moreover, crypto-erase may be performed in the device by simply destroying the internal key, and MEK if stored on the device. Moreover, if a MEK is created by combination of a tenant key, a type key, and an internal key, that MEK can then be crypto-erased by destruction of that tenant key, or of that type key, or of that internal key. Accordingly, in this latter example, crypto-erase may be performed at three different levels of granularity, depending on which key is destroyed.

Preferably, the device is configured to prohibit transfer of the internal key in any form to outside of the device. This ensures that crypto-erase performed at the device level disables all data encrypted using the internal key.

In one approach, several of the external keys are individually associated with unique data stored at different locations in a same logical block address range. This feature allows tenants to share the same storage area, without risk of one tenant being able to access another tenant's data. Thus, even if tenants share an address space, no other tenant can unencrypt the first tenant's data without the first tenant's external key.

In one approach, crypto-erase of all data corresponding to the tenant is performed by destroying the external key used by the tenant. This is an effective way to crypto-erase that tenant's data.

In one approach, crypto-erase of the particular type of data for all tenants is performed by destroying the type key associated with the particular type of data. This is an effective way to crypto-erase all of a particular type of data. This ensures that crypto-erase of all data of that type can be performed by simply definitively deleting that type key.

When using dedicated address bits, a null sequence in the second subset of bits indicates setting (e.g. importing) and/or deletion (e.g. removing all copies of a key within the ECD) of a given tenant's external key. This has the effect of enabling setting and/or deletion of a given tenant's external key.

In a preferred approach, the type keys are generated external to the ECD. The type keys may be served to the ECD as needed, e.g. from a key manager infrastructure, from a key store, etc. This allows more control over which type keys are provided to the ECD, thereby enhancing security. Note that type keys may effectively be assigned dynamically e.g. by some software that classifies data in any given IO to a data type.

In an alternate approach, the type keys are generated within the device and stored only in the device. This ensures that crypto-erase can be performed by simply deleting a type key within the device, without any chance of the type key being obtainable from outside the device. This affords more control over dissemination of the type keys. If the type keys are prohibited from leaving the device, deletion of a type key from the device ensures crypto-erase of the data encrypted therewith.

A device-implemented method, in accordance with another aspect of the present invention, includes generating a command having an address field of predefined length, wherein a first subset of bits in the address field identify an external key of a particular tenant, wherein a second subset of the bits in the address field corresponds to one of a plurality of type keys associated with different data types. The command is sent to a Key per IO-enabled device configured to encrypt and/or decrypt data associated with the command using a combined key generated from the external key and the type key associated with the second subset of the bits.

The foregoing methodology enables a device capable of simultaneously handling a smaller number of keys to accommodate a number of tenants about equal to the smaller number of keys, while also enabling use of unique keys for different data types for each of the tenants, as if the device were capable of handling many times as many keys. The methodology also enables such things as crypto-erase of a particular type of data for all tenants, as described in more detail below.

The data types may include privacy types, confidentiality types, etc. The methodology now enables use of particular keys for such data types.

In one preferred approach, the command is a Non-Volatile Memory Express (NVMe) compliant command. The present methodology enables use of an NVMe command for specifying type keys.

In one approach, crypto-erase of all data corresponding to the tenant is requested by requesting destruction of the external key stored in the Key per IO-enabled device. This is an effective way to crypto-erase that tenant's data.

In one approach, crypto-erase of the particular type of data for all tenants is requested by requesting destruction of the type key for that particular type of data. This is an effective way to crypto-erase all of a particular type of data.

A computer program product includes a computer readable storage medium having program instructions embodied therewith, the program instructions executable by a device configured to perform data operations on a storage medium to cause the device to perform any of the methodology presented herein.

A system, according to various aspects of the present invention, includes a Key per IO-enabled device, the device having a processor and logic integrated with the processor, executable by the processor, or integrated with and executable by the processor, the logic being configured to cause the device to perform any of the methodology presented herein.

Various approaches described herein are applicable to many types of storage media, including non-volatile memory and magnetic recording tape.

Other aspects and approaches of the present invention will become apparent from the following detailed description, which, when taken in conjunction with the drawings, illustrate by way of example the principles of the invention.

DETAILED DESCRIPTION

Figure 1:
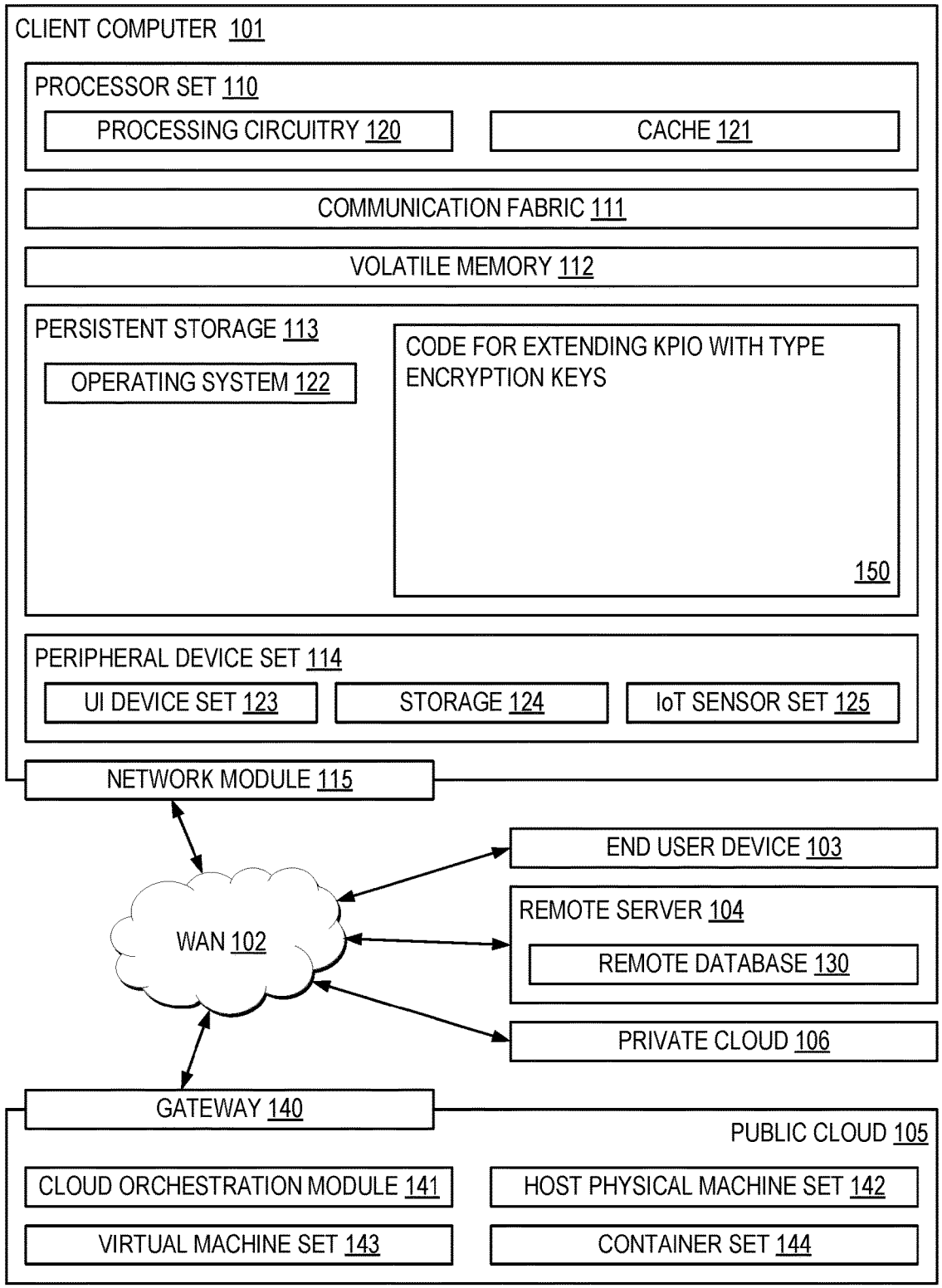
FIG. 1 is a diagram of a computing environment, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description herein discloses several preferred approaches of systems, methods and computer program products for dramatically increasing the number of keys that can be handled per tenant by Key per IO-enabled devices (e.g. ECDs, computers, key servers, etc., any of which may be a "computer" as described elsewhere herein). For example, a device capable of simultaneously handling only about 4,096 keys could potentially accommodate approximately 4,096 tenants and yet use unique keys on each of 16 (or some lesser number greater than 1) different data types for each of those 4,096 tenants, as if the device was capable of handling about 65,536 keys. In preferred aspects, only the number of address bits required to address all the different tenants are used for that purpose, and the remaining available address bits are used to address 'type' keys. Accordingly, the full number of bits of addressing provided by the relevant specification may be used to simultaneously indicate the tenant and the type of data. For example, under the NVMe specification that allows 16 bits for the address field in the header of a command, 12 bits of the address field may be used to identify the tenant, and 4 bits of the address field may be used to identify the type of data in the underlying read or write requested by the command.

A device-implemented method, in accordance with one aspect of the present invention, includes receiving a command having an address field of predefined length. A first subset of bits in the address field identify an external key of a particular tenant, and a second subset of the bits in the address field corresponds to one of a plurality of type keys associated with different data types. The external key identified by the first subset of bits is retrieved. The type key corresponding to the second subset of bits is also retrieved. The tenant and type keys are combined to create a combined key for use in encrypting and/or decrypting data associated with the command.

The foregoing methodology enables a device capable of simultaneously handling a smaller number of keys to accommodate a number of tenants about equal to the smaller number of keys, while also enabling use of unique keys for different data types for each of the tenants, as if the device were capable of handling many times as many keys. The methodology also enables such things as crypto-erase of a particular type of data for all tenants, as described in more detail below.

The data types may include privacy types, confidentiality types, etc. As noted above, the methodology now enables use of particular keys for such data types.

In one preferred approach, the command is a Non-Volatile Memory Express (NVMe) compliant command. The present methodology enables use of an NVMe command for specifying type keys.

The device may be configured as a Key per IO-enabled device. The present methodology provides new capabilities for KPIO-enabled devices.

In one approach, the method includes accessing an internal key stored within the device, generating a unique media encryption key using the internal key and the combined key, and using the media encryption key to encrypt and/or decrypt data associated with the command. This feature adds a further layer of security in that the internal key would be needed to access the data stored on the device. Moreover, crypto-erase may be performed in the device by simply destroying the internal key, and MEK if stored on the device. Moreover, if a MEK is created by combination of a tenant key, a type key, and an internal key, that MEK can then be crypto-erased by destruction of that tenant key, or of that type key, or of that internal key. Accordingly, in this latter example, crypto-erase may be performed at three different levels of granularity, depending on which key is destroyed.

Preferably, the device is configured to prohibit transfer of the internal key in any form to outside of the device. This ensures that crypto-erase performed at the device level disables all data encrypted using the internal key.

In one approach, several of the external keys are individually associated with unique data stored at different locations in a same logical block address range. This feature allows tenants to share the same storage area, without risk of one tenant being able to access another tenant's data. Thus, even if tenants share an address space, no other tenant can unencrypt the first tenant's data without the first tenant's external key.

In one approach, crypto-erase of all data corresponding to the tenant is performed by destroying the external key used by the tenant. This is an effective way to crypto-erase that tenant's data.

In one approach, crypto-erase of the particular type of data for all tenants is performed by destroying the type key associated with the particular type of data. This is an effective way to crypto-erase all of a particular type of data. Preferably, the type key is only stored on the device, and the device is configured to prohibit transfer of the type key in any form to outside of the device. This ensures that crypto-erase can be performed by simply deleting the type key, without any chance of the type key being obtainable from outside the device.

In one approach, a null sequence in the second subset of bits indicates setting (e.g. importing) and/or deletion (e.g. removing all copies of a key within the ECD) of a given tenant's external key. This has the effect of enabling setting and/or deletion of a given tenant's external key.

In a preferred approach, the type keys are generated externally to the ECD. The type keys may be served to the ECD as needed, e.g. from a key store, from the tenant, etc. This allows more control over which type keys are provided to the ECD, thereby enhancing security. Note that type keys may effectively be assigned dynamically e.g. by some software that classifies data in any given IO to a data type.

In an alternate approach, the type keys are generated within the device and stored only in the device. This ensures that crypto-erase can be performed by simply deleting a type key, without any chance of the type key being obtainable from outside the device. This affords more control over dissemination of the type keys. If the type keys are prohibited from leaving the device, deletion of a type key from the device ensures crypto-erase of the data encrypted therewith.

A device-implemented method, in accordance with another aspect of the present invention, includes generating a command having an address field of predefined length, wherein a first subset of bits in the address field identify an external key of a particular tenant, wherein a second subset of the bits in the address field corresponds to one of a plurality of type keys associated with different data types. The command is sent to a Key per IO-enabled device configured to encrypt and/or decrypt data associated with the command using a combined key generated from the external key and the type key associated with the second subset of the bits.

The foregoing methodology enables a device capable of simultaneously handling a smaller number of keys to accommodate a number of tenants about equal to the smaller number of keys, while also enabling use of unique keys for different data types for each of the tenants, as if the device were capable of handling many times as many keys. The methodology also enables such things as crypto-erase of a particular type of data for all tenants, as described in more detail below.

The data types may include privacy types, confidentiality types, etc. The methodology now enables use of particular keys for such data types.

In one preferred approach, the command is a Non-Volatile Memory Express (NVMe) compliant command. The present methodology enables use of an NVMe command for specifying type keys.

In one approach, crypto-erase of all data corresponding to the tenant is requested by requesting destruction of the external key stored in the Key per IO-enabled device. This is an effective way to crypto-erase that tenant's data.

In one approach, crypto-erase of the particular type of data for all tenants is requested by requesting destruction of the type key associated with that particular type of data. This is an effective way to crypto-erase all of a particular type of data.

A computer program product includes a computer readable storage medium having program instructions embodied therewith, the program instructions executable by a device configured to perform data operations on a storage medium to cause the device to perform any of the methodology presented herein.

A system, according to various aspects of the present invention, includes a Key per IO-enabled device, the device having a processor and logic integrated with the processor, executable by the processor, or integrated with and executable by the processor, the logic being configured to cause the device to perform any of the methodology presented herein.

Illustrative Computing Environment

Various aspects of the present disclosure are described by narrative text, flowcharts, block diagrams of computer systems and/or block diagrams of the machine logic included in computer program product (CPP) aspects of the present invention. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product aspect ("CPP aspect" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code for extending Key per IO with type encryption keys in block 150. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various aspects, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various aspects of the present invention.

Figure 2:
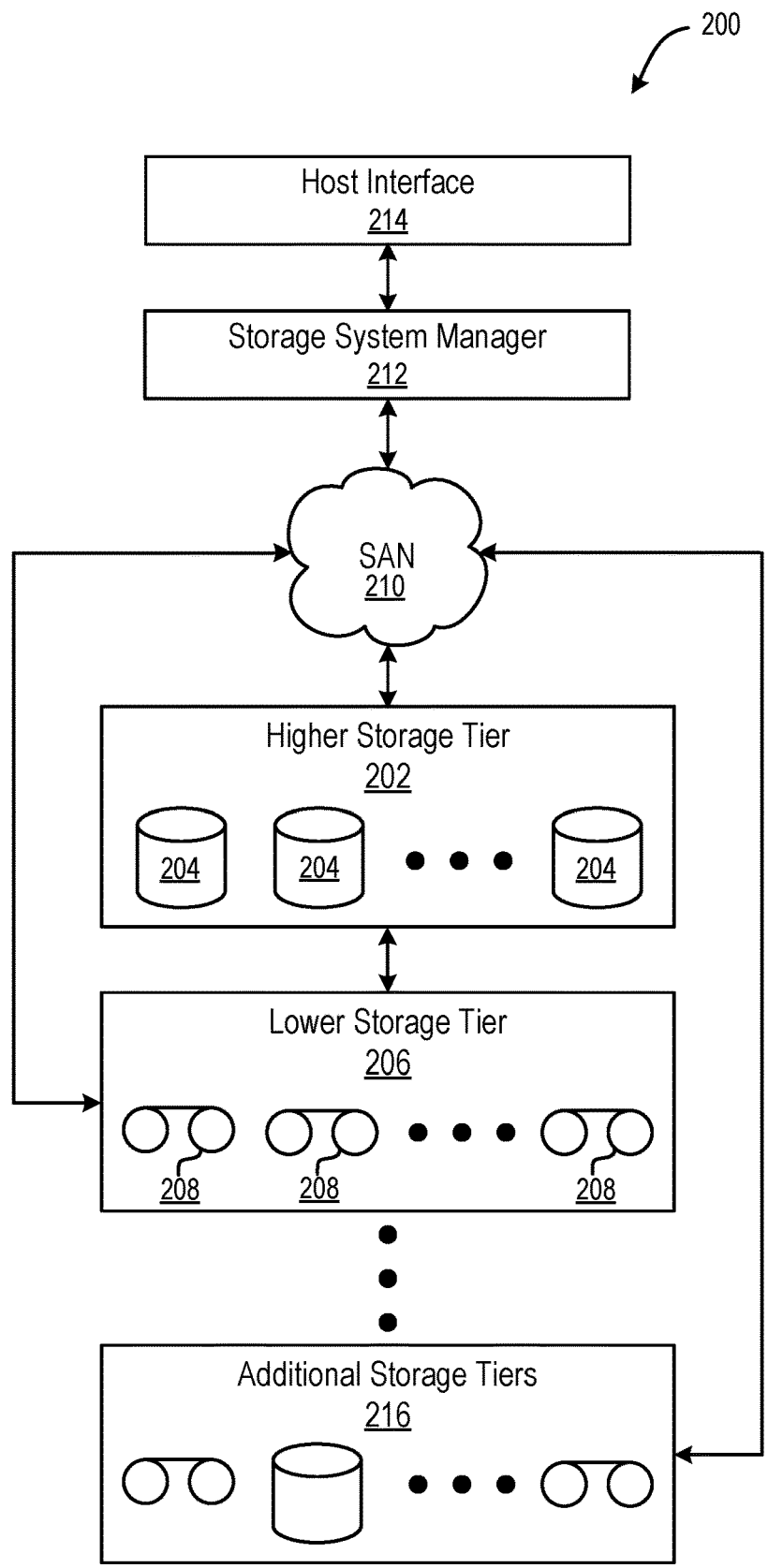
FIG. 2 is a diagram of a tiered data storage system, in accordance with one aspect of the present invention.

Now referring to FIG. 2, a storage system 200 is shown according to one aspect of the present invention. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some approaches, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Key Per IO Fundamentals

It is desirable in some cases to allow different entities to use the same address space in a storage device. A simplistic implementation of this, however, does not give a first entity any assurance of privacy from a second entity which could simply read what the first entity wrote to the storage device. One solution to this is having each entity (e.g. tenant) use a unique key which they can manage external to the device which the device requires to encrypt their write data and to decrypt their encrypted ciphertext. That key will be referred to herein as an external key, an external MEK, and Kext. Particularly, each tenant has a unique Kext with which to encrypt the respective tenant's data, and that Kext is different than the Kexts of the other tenants. This scheme is generally referred to as a Key per IO scheme.

When a Key per IO-enabled device (e.g. ECD, computer, etc.) powers up, it has no Kexts to perform encryption or decryption. Rather, Kexts are served to it in any desired manner (e.g. as needed, in conjunction with a request for a read or write operation, etc.). For example, a tenant may send a Kext along with a key tag (e.g. T) by which it will be referenced in the future, which the device stores in volatile memory. Then, when the device receives a command (e.g. an NVMe command) which includes the key tag T as part of the command header, the Key per IO-enabled device retrieves the associated Kext from memory and uses it to encrypt plaintext data being written by the host before the ciphertext is stored to non-volatile memory, or to decrypt ciphertext data being read from non-volatile memory before the corresponding plaintext is sent to the host. The device may accumulate multiple Kexts associated with different key tags. In some approaches, if the power is lost, the Kexts, having only been stored in volatile memory, will be lost and thus need to be re-served to the device after it is powered back on before they can be used again.

A goal of many Key per IO schemes is to allow different tenants (users, applications, computers, etc.) to share the same address space. Previous to the teachings presented herein, a tenant's Kext was directly used as the MEK to encrypt and decrypt the tenant's data. In theory, the encrypted data of a first tenant is secure against cleartext access by a second tenant so long as their respective Kexts are unique from one another and remain secure from usage by the other tenant. When a first tenant, or control infrastructure responsible for first tenant's data, wants to erase the first tenant's data on the device, the first tenant or control infrastructure destroys the first tenant's Kext external to the device, e.g. by erasing the Kext, overwriting the Kext, or otherwise destroying the Kext, including any residual copies of the Kext not only external to the device, but also any copy or copies stored in volatile memory internal to the device. Specifically, if there is any possibility that first tenant's Kext has been served to the device since its last power cycle or cold boot, the first tenant should instruct the device to erase the Kext which is used as a MEK internal to the device. By destroying all instances of the Kext external and internal to the device, this would effectively crypto-erase the data encrypted with that MEK still stored to and recoverable from that device.

However, as noted above, destroying the Kext of a tenant renders all data by that tenant unreadable. Prior to the inventive disclosure herein, the only way to allow a tenant to store different types of data was to assign additional Kexts to that tenant. However, given the limitations on how many keys a Key per IO-enabled device can handle and/or store, the more types of data accommodated, the fewer the number of tenants that can be handled.

Inventive Methods for Effectively Increasing the Number Keys Usable in Key Per IO-Enabled Devices Various aspects of the present invention provide a way to effectively increase the number of keys usable in Key per IO-enabled devices without sacrificing the number of tenants that the Key per IO-enabled device can handle. The following description discloses several preferred approaches of systems, methods, and computer program products for using 'type' keys with Key per IO-enabled devices, in a version of KPIO modified as described herein and referred to below as KPIO Extended, or KPIO-X for short.

While much of the description is presented herein in association with an exemplary implementation with a Key per IO-enabled device such as an SED or ECD of any type, this has been done by way of example only and solely to provide a context as an aid for the reader. Accordingly, the concepts and teachings presented herein are equally applicable to implementations with storage media such as magnetic recording tapes, memory cards, optical media, etc., and related devices.

Figure 3:
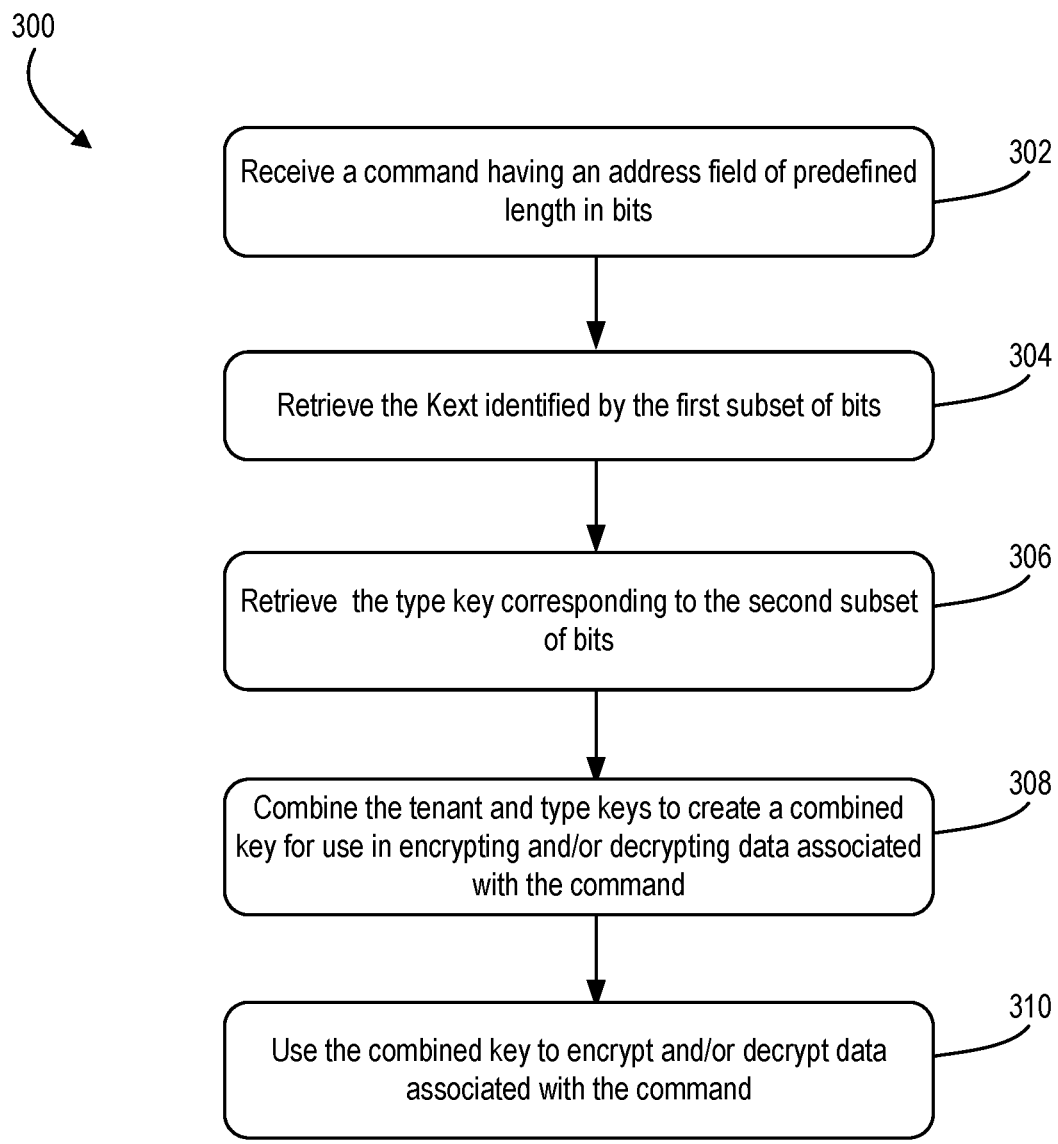
FIG. 3 is a flowchart of a method, in accordance with one aspect of the present invention.

Now referring to FIG. 3, a flowchart of a device-implemented method 300 is shown according to one aspect of the present invention. The method 300 may be performed in accordance with the present invention in any of the environments depicted in FIGS. 1-2, among others, in various approaches. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various approaches, the method 300 may be partially or entirely performed by a Key per IO-enabled device configured to operate according to KPIO-X, a storage controller, a key server, or some other device having one or more processors therein. The processor (e.g. processing circuit(s), chip(s), and/or module(s) implemented in hardware and/or software), and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

The method 300 may be performed by a Key per IO-enabled device, such as one that stores data on a storage medium, which may be any type disclosed herein (e.g. magnetic tape, magnetic disk, nonvolatile random access memory (NVRAM), etc.). Accordingly, the device may be any type of data storage device (e.g. tape drive, SSD, HDD, encryption-capable USB drives, NVRAM modules, etc.). Moreover, the device may be an Encryption-Capable Drive (ECD) of the removable data storage type, such as an encryption capable USB drive, an encryption-capable tape drive, a self-encrypting drive (SED), etc.

As shown in FIG. 3, method 300 may initiate with operation 302, in which a command having an address field of predefined length in bits (e.g. as specified by a specification), is received. Note that any field in the header of the command, or at some other prespecified location in the command, may be considered an address field as used herein. In some approaches, the command is an NVMe compliant command. In other approaches, the command is another type of known command, but modified according to the teachings herein to include the subsets of bits noted immediately below.

A first subset of bits in the address field identifies an external key (Kext) of a particular tenant. For example, a particular sequence of bits may correspond to a particular Kext, and the identification can be made (e.g. using a table of such sequences and the Kexts corresponding to such sequences).

A second (typically disjoint) subset of the bits in the address field corresponds to one of a plurality of type keys that are associated with different data types. Any type of data that would become apparent to one skilled in the art upon reading the present disclosure may be specified. For example, the data types may include privacy and/or confidentiality types.

The lengths of the first and/or second subset of bits are preferably prespecified. In the example above, where the address field specification is 16 bits, the first subset of bits is 12 bits long, and the second subset of bits is 4 bits long. Note that the relative lengths may be any prespecified value (e.g. 8 bits and 8 bits, 10 bits and 6 bits, 14 bits and 2 bits, and so on). Moreover, the combined lengths may together equal less than the full address field specification in some approaches (e.g. use of only 10 bits and 4 bits in a 16 bit address space). The leftover address space bits may be left set to zeroes, some other preset null value, etc.

The command received in operation 302 may be received by the device from one or more external sources for Key per IO operation. For example, the command may be received from a computer of the tenant, a storage controller, etc.

In operation 304, the Kext identified by the first subset of bits is retrieved. The Kext may be stored on the device, retrieved from a key server, etc. A lookup table correlating Kexts with predefined sequences of bits may be queried using the first subset of bits.

In operation 306, the type key corresponding to the second subset of bits is retrieved. The type key may be stored on the device, retrieved from a key server, etc. A lookup table correlating type keys with predefined sequences of bits may be queried using the second subset of bits.

In operation 308, the tenant and type keys are combined in some way to create a combined key for use in encrypting and/or decrypting data associated with the command. The combining may be a direct combination of the two keys, or as described below, may entail combining one of the keys with a derivative of the other key (e.g. a wrapped key created using the other key, or a combination of derivatives of both keys). All such variants should be considered equivalents.

The combined key may then be used, as noted in operation 310, to encrypt and/or decrypt data associated with the command.

In one approach, if the keys are effectively independent keys, a simple XOR may be satisfactory. In other approaches, more complex key derivation algorithms known in the art may be used.

Continuing with the example given above, where a device is only capable of handling up to 4,096 keys and the address field specification is 16 bits, then only 12 of the 16 bits need be used to specify (e.g. address) which of those few thousand keys is to be used to encrypt (and/or decrypt) data associated with a given input/output (IO). Accordingly, in this example, up to 4096 keys can be addressed without needing more than 12 bits of addressing. If only 12 bits of the header field are used to address the number of simultaneous Kexts in the device, 4 bits can be used for other purposes.

Accordingly, various aspects of the present invention use the otherwise unneeded and/or unused address bits to specify other keys, which are referred to as "type keys" herein. The type keys are also used to encrypt (and/or decrypt) a host write (and/or read). Continuing with the 16 bit address specification example, one being apprised of the present disclosure can appreciate that, if only 12 bits are required to address all of the Kexts that are supported, there are 4 otherwise unused address bits set up to address type keys. With use of those four address bits, up to 16 type keys can potentially be specified if this entire additional address space is used. Moreover, one of the 16 address values (e.g. 0000b) can be set aside to specify a null type key (e.g. effectively all zeroes) to be 'used,' leaving 15 other (non-null) type keys which can be set or specified.

As one example of use, assume the 15 non-null type key address values are used as follows:
 0000b=Null (e.g. all zeroes) key
 0001b=COc=tenant's Company (CO) Confidential data
 0010b=COp=private Tenant data (e.g. Personally Identifiable Information (PII))

0011b=COo=tenant's general data that is neither PII nor independently Company Confidential
0100b=ProjXr=Project X (ProjX) data that is Company Confidential Restricted
0101b=ProjXc=tenant's ProjX related data that is Company Confidential
0110b=ProjXp=tenant's ProjX related data that is private (e.g. contains PII)
0111b=ProjXo=tenant's ProjX data that is neither PII nor independently Company Confidential
1000b=ProjYr=Project Y (ProjY) data that is Company Confidential Restricted
1001b=ProjYc=tenant's ProjY related data that is Company Confidential
1010b=ProjYp=tenant's ProjY related data that is private (e.g. contains PII)
1011b=ProjYo=tenant's ProjY data that is neither PII nor independently Company Confidential
1100b=ProjZr=Project Z (ProjZ) data that is Company Confidential Restricted
1101b=ProjZc=tenant's ProjZ related data that is Company Confidential
1110b=ProjZp=tenant's ProjZ related data that is private (e.g. contains PII)
1111b=ProjZo=tenant's ProjZ data that is neither PII nor independently Company Confidential Because the low 12 bits of the 16 bit header field are used to identify up to 4096 'tenant' keys. If data written by a given tenant (Ten_X) always has the correct lower 12 bits, that data is associated with one of the up to 4096 Kexts. If each record is tagged by some piece of software as being Company Confidential data being written by that tenant, then the high 4 bits of the KeyID field are set to 0001b. The net result is that one key associated with Ten_X and another key associated with COc are fetched and combined in some way, e.g. a simple XOR or another known key derivation algorithm to create a combined key which is used to encrypt (and/or decrypt) that host write (and/or read).

Media Encryption Key

In some approaches, a media encryption key (MEK) created using the combined key may be used to encrypt and/or decrypt data. The MEK may be used in the various manners described elsewhere herein. For example, the MEK may be created by accessing an internal key stored within the device. A unique MEK is created using the internal key and the combined key referenced above, e.g. by XORing the keys together, by use of a known key derivation technique, etc. In another approach, an MEK may be formed by combining the tenant key with the type key. In yet another approach, an MEK may be formed by combining a tenant key, a type key, and the device's internal key.

The thus formed MEK is then used to encrypt and/or decrypt data associated with the command. This feature adds a further layer of security in that the internal key would be needed to access the data stored on the device. Moreover, crypto-erase may be performed in the device by simply destroying the internal key, and any volatile copy of the MEK stored on the device.

Preferably, the device is configured to prohibit transfer of the internal key in any form to outside of the device. This ensures that crypto-erase performed at the drive level disables all data encrypted using the internal key, e.g. as described in more detail below.

In some aspects, because the type key is combined with a tenant's specific Kext to create the combination key that is then used to write and read data for that tenant, even if tenants share an address space, no other tenant can unencrypt the first tenant's data without the first tenant's Kext. Accordingly, several different tenant's Kexts may be individually associated with unique data stored at different locations in a same logical block address range, the allowed range of logical blocks (e.g. in the NVMe namespace) of the storage medium, which may be millions of sectors long. Note that usually the assignment of Key IDs to keys is effectively made outside the boundary of the ECD, by some logic up above the ECD. That logic up above should operate perfectly, in a deployment where it cannot be hacked, so that no command is given to the ECD with the Key ID specifying address bits being other than what they should be.

Crypto-Erase Using Type Key

By using a combined key to encrypt and/or decrypt host written sectors, the data encrypted with that combined key can now effectively be crypto-erased in one of two basic ways. Either the Kext (e.g. Ten_X), or the type key (e.g. COc), can be erased from all places (e.g. key stores) it is stored, including from the device itself. Accordingly, crypto-erase of all data corresponding to the tenant may be performed by destroying all instances of the Kext and, if applicable, all associated media encryption key(s) in the device created using that Kext.

Note that a given Ten_X Kext may be used with any type key (corresponding to any type of data written by that tenant). If so, deleting the Ten_X key crypto-erases all data written by the given tenant, regardless of type.

But note also that the ProjXr type key may potentially be used by other or all tenants. If so, deleting the type key ProjXr simultaneously crypto-erases all Company Confidential Restricted data associated with ProjX written by any tenant. If one additionally deleted the type keys associated with ProjXc, ProjXp, and ProjX0, then all data associated with Project X would be cryptographically erased. Accordingly, a particular type of data may be crypto-erased for all tenants by destroying all instances of the type key corresponding to that type of data, and, if applicable, all associated MEKs created using that type key. Preferably, the type key is only stored on the device, and the device is configured to prohibit transfer of the type key in any form to outside of the device.

Any of these methods of crypto-erase may be used, modified, and/or combined with features described below with respect to additional approaches for crypto-erase.

Device Configuration to Use Type Keys

The following description describes one possible way of adapting a KPIO-enabled device of any type to operate as described herein, which, as mentioned above, is referred to here as KPIO Extended, or KPIO-X for short. It should be noted that in most cases detailed in this disclosure, there are viable alternate, equivalent methods of adapting the device and KPIO commands to achieve the same goal, as would become apparent to one skilled in the art after reading the present disclosure.

Multi-Mode Operation

A straightforward way of adapting a device to be capable of KPIO-X operation is to start with a device capable of operating in conformance with KPIO, and then extending that device to allow it to be able to operate in a different mode of operation, specifically capable of KPIO-X operation. Such a device may be extended to be capable of operating in any of the following ways.

A first way is in strict accordance with the present existent KPIO specification (which is to say without any type keys), and the second (which the drive can be configured to use instead) is to operate in a way that does support type keys, thus conforming to the KPIO-X operation described here.

The device is then configured by predefined commands to control the device to operate in one mode or the other, e.g. either KPIO or KPIO-X.

Specifying the Number of External Keys and the Number of Type Keys

The current KPIO specification allows a user to query the device (e.g. drive) as to the total number of encryption keys that can be supported and the number of encryption keys per NVMe namespace. This allows the drive to report the number of Kexts supported and should be the simplest way to report the number of Kexts supported when operating in KPIO-X mode.

In one approach for the drive to be able to report the number of type keys supported in total and the number of type keys supported per NVMe namespace, a vendor unique command is created that uses much of the same command constructs to allow such reporting.

It should be noted that when the device is operating in KPIO-X mode in some approaches, the two numbers reported (e.g. for a given NVMe namespace) should be consistent with one another so that the tenant and type keys can be independently addressed with different address bits. As an example, for support for up to 4,096 Kexts (though it does not have to be an exact 2^N number), use of the low 12 address bits in the NVMe command is needed. This only leaves at most 4 remaining high address bits for type key addressing. If one of those type key addresses is set aside for use as a null key (e.g. as described in more detail below), then the number of type keys supported may be up to, but no more than, (2^4)−1=15 (but does not need to be exactly (2^M)−1, and could be zero (though in the latter case, it effectively becomes like regular KPIO rather than KPIO-X, except for the possibility to support vendor unique commands).

In some approaches, the type/tenant segmentation described herein may be managed in a way that does not require storage of any additional keys. For example, assume a given SSD can hold 4096 keys and so will consume 12 of the 16 address bits. A goal is to allow for use of 15 unique type keys plus one null type key, addressed by the remaining 4 address bits. However, assume there are no additional places to store these type keys. This can be handled by reducing the number of keys assigned to tenants from 4096 to 4080. Thus, 4080 would be the number reported as far as available external key locations, at least when in KPIO-X mode. When in KPIO mode, the device may report either 4080 (to be consistent with when in KPIO-X mode) or 4096, assuming those last keys can be used for tenants. The simplest implementation (from both an ASIC design point of view and from an ease of user understanding point of view) would be to always report 4080 external keys. When in KPIO-X mode, the device would then report, e.g. via a vendor unique querying command, 15 type key settings. Note that each of the 4080 external keys may potentially be used with each of 15 type key settings, which allows for 4080×15=61,200 key combinations, which approaches the 64K number that 16 bits can address.

Exemplary Technique to Set and Delete an External Key

In some approaches, a null sequence in the second subset of bits (high bits) indicates setting and/or deletion of the Kext. The null sequence may be all zeros as in the example above. However, in other approaches, the null sequence may instead be all ones, or some prespecified sequence of zeros and ones that is not used to specify a type key.

In one illustrative approach, the tenant Kext (or MEK) keys may be set the standard KPIO way, but adapted for this purpose, e.g. by setting all zeroes on the high "type key" address bits.

Similarly, the tenant Kext (or MEK) keys may be deleted from the device the standard KPIO way, but adapted for this purpose, e.g. by setting all zeroes on the high "type key" address bits.

Exemplary Technique to Set a Type Key

In some approaches, the type keys may generally be set the standard KPIO way, adapted for this purpose, but with a non-zero value in the high "type key" address bits. Note the value sent in the low "external key" address bits could be set to all zeroes (if that were desired) or could be allowed to be any value if that is preferred.

Exemplary Technique to Delete a Type Key

In some approaches, the type keys may be deleted from the device the standard KPIO way, adapted for this purpose, but with a non-zero value in the high "type key" address bits. As above, the value sent in the low "external key" address bits could be set to all zeroes (if that were desired) or could be allowed to be any value if that were preferred.

Benefit of Setting Aside a "Null Key" Setting

The descriptions in the immediately prior paragraphs make explicit use of an all zero setting in the high "type key" address bits to specify operation (e.g. setting or deleting) on a Kext without affecting any type keys. Similarly, a non-zero setting in the high "type key" address bits, when used in conjunction with commands that set and delete keys, indicate the operation is to be on a specific type key, and preferably do not affect any of the external keys.

The cost of setting aside a null key setting is that it consumes one of the "type key" address bit settings, e.g. resulting in 15 type key settings being available rather than 16. However, it may be desirable to allow encryption with just the external key, without use of any type key (which may be thought of as a known, default type key, e.g. an all-zero key). If so, this 16th type key setting is effectively being used to specify use of the known default 'type' key.

With regards to setting aside one null "type" key setting, it should be noted that in other approaches, one null "tenant" key setting may be similarly set aside to be used when setting or deleting a type key. This is optional and not strictly required, in that the logic can simply detect a non-zero value in the type keys, and in response to such detection, the device recognizes the set key or delete key is intended solely for the type key addressed. If a null "tenant" key setting is desired, such setting should preferably be an all ones setting to the low address bits associated with external keys because that would be the last external key address used and so would most likely not be used in most use cases. The consequence of setting aside one null "tenant" key setting would be having one less tenant Kext available (e.g. if 12 bits are set aside for external key usage, we could support only 4095 tenants, and not 4096).

Additional Security Features Usable with the Methodologies Presented Herein

In some approaches, the KPIO-X configuration described herein may be configured to allow for keys to be stored only at, and thus deletable at, the device. Such configuration is discussed elsewhere herein.

In one approach, the type keys are generated externally to the device. The type keys can be served to the device from some external key management entity, e.g. in a similar way that tenant keys may be served to the device.

In another approach, all type keys may be internally generated by the device and stored within the device. For example, the type keys are generated within the device and stored only in the device. This affords more control over dissemination of the type keys. If the type keys are prohibited from leaving the device, deletion of a type key from the device ensures crypto-erase of the data encrypted with that type key.

In yet another approach, any key in cleartext form (e.g. unwrapped) Kexts, and, if applicable, the MEKs, are stored only in the device, ideally in volatile memory. Accordingly, power cycling or power loss of the device purges these keys from the device. The type keys may be stored in the device in nonvolatile memory, in the clear and/or in wrapped form. In one approach, an externally provided Kext is combined with the internally generated type key and the resulting combined key is used for actual bulk encryption.

In yet other approaches, one or more of the types of keys (Kext, type key, combined key, MEK) may be stored within the device, e.g. in a non-volatile memory of the device. That non-volatile memory may be on a dedicated purpose IC such as a NAND flash, or could be embedded in some larger IC such as an FPGA, ASIC, CPU, etc. In some approaches, at least one of the types of keys is stored in the device in raw (unencrypted) form. In other approaches, one or more of the types of keys is stored in the device in wrapped form (e.g. encrypted form, password protected form, obfuscated form, etc.). In the case where one or more of the types of keys is stored in wrapped form, information such as another key, a password, etc., for unwrapping the key(s) may be retrieved and/or received and used to unwrap the key(s). For example, a PIN or password required to administer the device may be used as the wrapping key used to wrap the internal key. Alternatively, a Key Encrypting Key (KEK) could be used as the wrapping key to wrap the key(s). Preferably, the only non-volatile storage of the one or more of the types of keys is in wrapped form.

As mentioned above, the combined key may be created from multiple keys using any suitable technique that would become apparent to one skilled in the art after reading the present disclosure. For example, simple XOR may be used. In any of the approaches used herein, a National Institute of Standards and Technology (NIST)-approved key derivation function (KDF) may be used to calculate the bulk encryption key actually used. This is an improvement on the direct key model that KPIO uses today in that it guarantees the ability to do crypto-erase at the drive and uses externally provided entropy.

A system, in accordance with one aspect of the present invention, includes a Key per IO-enabled device, the device having a processor and logic integrated with the processor, executable by the processor, or integrated with and executable by the processor. The logic is configured to cause the device to perform any of the methodology presented herein, including the method of FIG. 3.

Tenant Device Operation with KPIO-X

Figure 4:
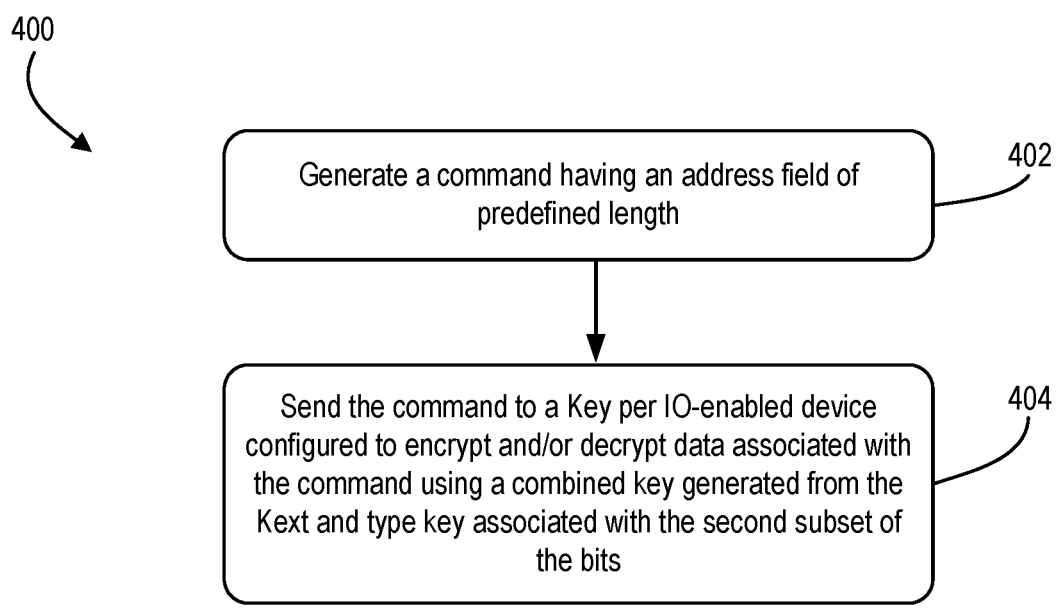
FIG. 4 is a flowchart of a method, in accordance with one aspect of the present invention.

Now referring to FIG. 4, a flowchart of a method 400 is shown according to one aspect of the present invention. The method 400 may be performed in accordance with the present invention in any of the environments depicted in FIGS. 1-3, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer of the tenant, or some other device having one or more processors therein. The processor (e.g. processing circuit(s), chip(s), and/or module(s) implemented in hardware and/or software, and preferably having at least one hardware component) may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a command having an address field of predefined length is generated. In one approach, the command is an NVMe compliant command, though other types of commands known in the art may be adapted for use, in accordance with various aspects of the present invention. A first subset of bits in the address field identify a Kext of a particular tenant, and a second subset of the bits in the address field corresponds to one of a plurality of type keys associated with different data types.

In operation 404, the command is sent to a Key per IO-enabled device configured to encrypt and/or decrypt data associated with the command using a combined key generated from the Kext and the type key associated with the second subset of the bits. As noted above, the combining may be a direct combination of the two keys, or as described below, may entail combining one of the keys with a derivative of the other key e.g. a wrapped key created using the other key. All such variants should be considered equivalents.

As also noted above, the data types may include privacy types and/or confidentiality types.

In one approach, crypto-erase of all data corresponding to the tenant is requested by requesting destruction of the Kext stored in the Key per IO-enabled device and, if applicable, all associated media encryption key(s) in the device created using that Kext. If more than one instance of the Kext is present on the device, the request preferably causes destruction of all instances thereof.

In another approach, crypto-erase of the particular type of data for all tenants by requesting destruction of all instances of the type key and, if applicable, all associated media encryption key(s) in the device created using that type key.

Additional Examples of Crypto-Erase in Key Per IO-Enabled Devices

The following description discloses several preferred approaches of systems, methods and computer program products for enabling locally encrypted data to be crypto-erased by internal action in Key per IO-enabled devices configured for KPIO-X, such as ECDs. In general, data is encrypted and/or decrypted using a MEK created from a combined key as noted above and an internal key (Kint) stored within the storage device, e.g. ECD, SED, tape cartridge, portable memory, etc. Upon destruction of the Kint and all MEKs created from it, all data which was only stored encrypted with that MEK is crypto-erased, and thus becomes unrecoverable. Similarly, destruction of all copies of the combined key and the Kext used to create the combined key crypto-erases the data corresponding to that Kext. Likewise, destruction of all copies of a combined key and the type key used to create that combined key crypto-erases the data corresponding to that type key.

Moreover, because the Kint is combined with a combined key created using the tenant's specific Kext to create a MEK that is then used to write and read data for that tenant, even if tenants share an address space, no other tenant can unencrypt the first tenant's data without the first tenant's Kext or associated combined key. Accordingly, several Kexts may be individually associated with unique data stored at different locations in a same logical block address range, the allowed range of logical blocks (e.g. in the NVMe namespace) of the storage medium, which may be millions of sectors long. This is not to be confused with the range of an individual write command which would, with Key per IO, all be written using a single Kext specified by the key tag that arrived in the header of that write command.

Crypto-Erase in ECD and SED

While much of the description is presented herein in association with an exemplary implementation with a SED or ECD of any type, this has been done by way of example only and solely to provide a context as an aid for the reader. Accordingly, the concepts and teachings presented herein are equally applicable to implementations with storage media such as magnetic recording tapes, memory cards, optical media, etc., and related devices.

Figure 5:
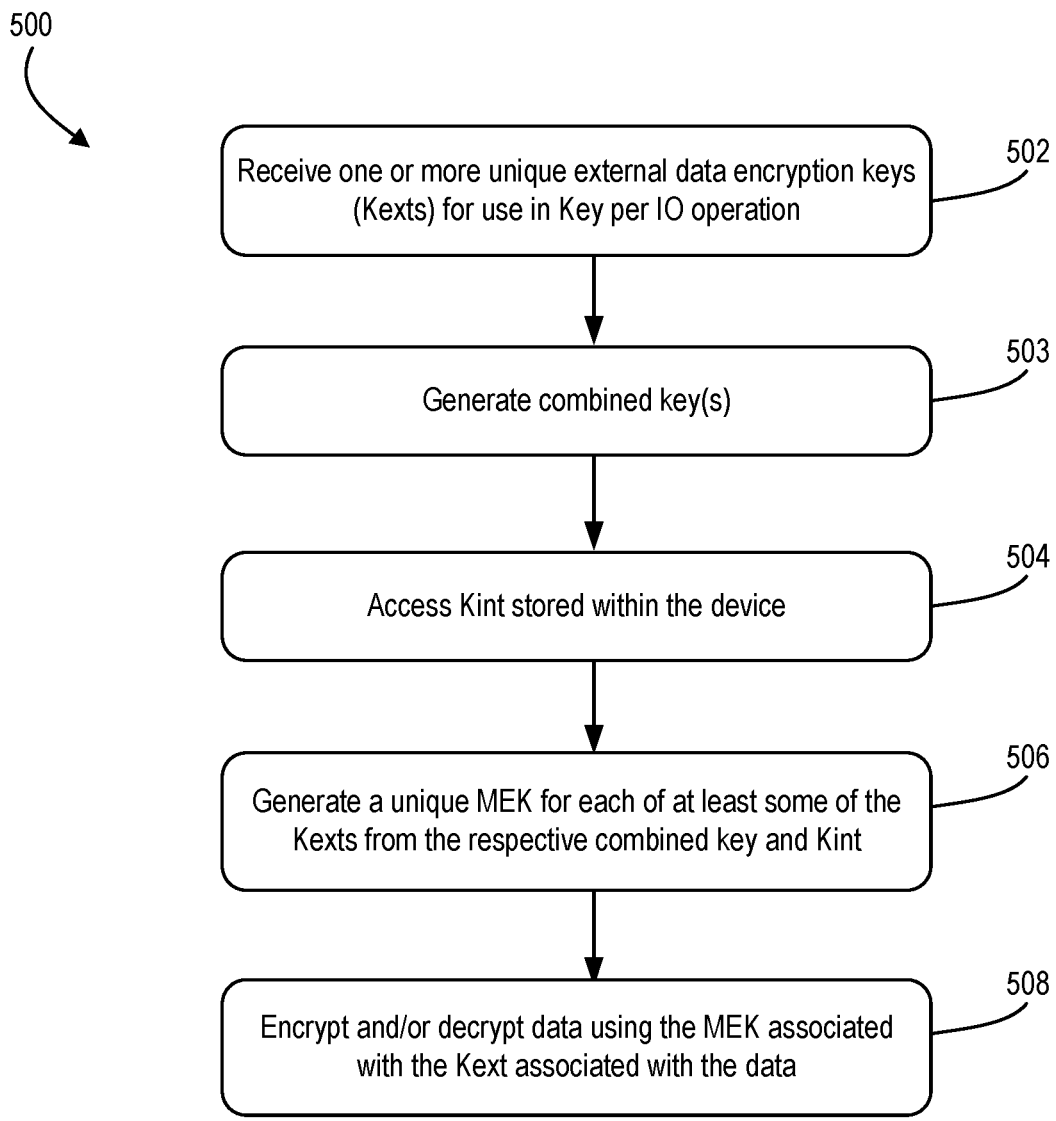
FIG. 5 is a flowchart of a method, in accordance with one aspect of the present invention.

Now referring to FIG. 5, a flowchart of a method 500 is shown according to one approach. The method 500 may be performed in accordance with the present invention in any of the environments depicted in the other FIGS. described herein, among others, in various approaches. Of course, more or fewer operations than those specifically described in FIG. 5 may be included in method 500, as would be understood by one of skill in the art upon reading the present descriptions.

Each of the steps of the method 500 may be performed by any suitable component of the operating environment. For example, in various approaches, the method 500 may be partially or entirely performed by a device such as a computer, a drive, or some other device having one or more processors therein. The processor, e.g. processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a device, that is configured to perform data operations on a storage medium such as reading and/or writing data from/to the storage medium, receives one or more unique external encryption keys (Kexts). The one or more Kexts are served to the device from one or more external sources for use in Key per IO operations. An external source may be any external source. For example, the external source may be an application running in a virtual machine, or container, or natively on a host server which is writing or reading data, or a control infrastructure which handles all the key provisioning transparently to those applications, virtual machines, containers, or host servers. The external source could also be a key store, a key server, a key input by a user (e.g. via a keyboard, by insertion of a flash drive, etc.).

The Kext(s) are used with type key(s) specified in a command header to generate combined key(s), e.g. as described in more detail above. Note operation 503.

The Kext(s) and combined key(s) are preferably stored in the device only in volatile memory, so that they are destroyed upon power down or reboot of the device. The Kext(s) may be received in any suitable manner, such as: as needed, all at once, in response to a request for a Kext (e.g. from the device), etc. For example, a Kext may be received in conjunction with a request to read, or write, data stored, or to be stored, on the storage medium in encrypted form.

The storage medium may be any type disclosed herein, e.g. magnetic tape, magnetic disk, nonvolatile random access memory (NVRAM), etc. Accordingly, the device may be any type of data storage device (e.g. tape drive, SSD, HDD, encryption-capable USB drives, NVRAM modules, etc.). Moreover, the device may be an Encryption-Capable Drive (ECD) of the removable data storage type, such as an encryption capable USB drive, an encryption-capable tape drive, a self-encrypting drive (SED), etc.

In operation 504, a Kint stored within the device is accessed, e.g. from a non-volatile memory of the device. That non-volatile memory could be on a dedicated purpose IC such as a NAND flash, or could be embedded in some larger IC such as an FPGA, ASIC, CPU, etc. In some approaches, the Kint is stored in the device in raw (unencrypted) form. In other approaches, the Kint is stored in the device in wrapped form (e.g. encrypted form, password protected form, obfuscated form, etc.). In the case where Kint is stored in wrapped form, information such as another key, a PIN, password, etc., for unwrapping the Kint may be retrieved and/or received and used to unwrap the Kint. For example, a PIN or password required to administer the device may be used as the wrapping key used to wrap the internal key. Alternatively, a Key Encrypting Key (KEK) could be used as the wrapping key to wrap the internal key. Preferably, the only non-volatile storage of the internal key would typically be in wrapped form.

In preferred aspects, the device is configured to prohibit transfer of the Kint in any form to outside of the device. However, a microprocessor or controller internal to the device may access the Kint within the device.

In operation 506, a unique MEK is generated for each of at least some of the Kexts using the Kint and the associated one of the one or more combined keys. In other words, the MEK associated with a given Kext used for generation thereof is different than any other MEK. Any known technique may be used to create a MEK from the combined key and Kint, e.g. by XORing the combined key and Kint together, by applying another known key derivation or hashing algorithm, by appending the two keys together to create a larger MEK, etc.

The MEK for a given data set may be created at any desired time. In one approach, the MEK is generated in response to creation of the combined key. In another approach, the MEK is created in response to receiving a request to perform a data operation for data associated with the Kext.

Regardless of when the MEK is created, it may be stored volatilely within the device for use and/or reuse, may be used for a data operation and discarded, etc. Preferably, the MEK in cleartext form is stored within the device only in volatile memory, so that it is lost when the device is powered down or reset. This helps ensure that the MEK is not accessible from outside the device, nor if the device becomes disabled and is consequently powered off and removed from the storage system.

In operation 508, in response to receiving a request to perform a data operation for data associated with one of the combined keys, the MEK associated with that combined key is used to encrypt and/or decrypt the data, e.g. using otherwise conventional encryption/decryption techniques. For example, in response to receiving a read request, the ciphertext of the requested data is decrypted using the appropriate MEK in operation 508 to give the unencrypted (i.e. cleartext) form of the requested data, which can then be output to the requestor. The ciphertext of the requested data may be copied into a buffer and then decrypted, may be decrypted "on the fly" during reading, etc. The decrypted data is output, e.g. to a requestor of the data over a host interface, etc.

In some approaches, the MEK is deleted upon completion of the associated request. In other approaches, the MEK may be retained in some form of volatile memory or register for reuse. In either case, the storage device may retain the Kexts, combined keys, and/or associated MEKs until told to forget them by explicit command or reset, or a power off causes them to be forgotten.

Aspects of the various operations of FIG. 5 are provided below. Such aspects are presented by way of example only, and are not intended to be limiting. As noted above, much of the present discussion refers to an ECD; this has been done by way of example only. Moreover, such aspects may be combined in any way, in accordance with the plethora of possible aspects and approaches to practice the present invention.

A MEK may be created from two separate keys using any technique known in the art and/or that would become apparent to one skilled in the art upon reading the present description. For example, one way to create a MEK which requires the use of both Kint and a combined key to calculate is to have Kint be a generated random number, and then perform a calculation which requires both Kint and the combined key, such as the bitwise XOR of the two together, or concatenation of these two values, to calculate the MEK.

Kint may originate from any conceivable source. Kint is preferably created internal to the ECD, this being the most secure approach, as copies of Kint would never need to exist outside of the ECD unless deliberately copied therefrom. For example, Kint is generated in a known manner using output from a random number generator within the ECD.

In other approaches, Kint may be created external to the ECD and served to the ECD. For example, Kint may be programmed into the device during manufacturing build, may be programmed into the device by an administrator, may be inserted into the device during configuration or formatting of it, etc.

In one aspect, Kint may be specific to a particular set of data, and thus the device may store multiple unique Kints, each associated with a unique dataset.

Preferably, the ECD is configured to not allow any external visibility of Kint or transfer or copying of Kint out of the ECD.

In one illustrative approach, the combined key and only the wrapped form of Kint is stored in non-volatile memory in the ECD. Kext is only stored outside of the ECD in non-volatile form and so has to be served to (or accessed by) the ECD at least once after a power cycle and/or cold boot to allow the MEK to be calculated. The MEK can be calculated only when the ECD has both Kint and Kext. Thus, Kext has to be served to (or accessed by) the ECD in some form to calculate the combined key. There are many ways this may be done, according to various aspects. One way is to have the Kext injected into the ECD wrapped with a Key Encrypting Key (KEK). Alternately, if the ECD supports a Key Management Interoperability Protocol (KMIP) client, it may request and receive Kext over a secure channel (such as protected by TLS or IPsec) from an external key manager of a type known in the art. Alternately, Kext may be served to the ECD in a manner similar to the way Personal Identification Numbers (PINs) are, e.g. in cleartext form, through a secure tunnel established for Security Protocol In and Security Protocol Out commands, etc.

Kint is preferably stored in the ECD in wrapped form and is unwrappable until the wrapping key (which may be a KEK or may instead be dependent on one or more password(s) or PIN(s), served to the ECD to authenticate one or more different roles the ECD supports (e.g. Admin1)) is provided. Accordingly, whatever parts of the wrapper key are provided from outside of the ECD are served to the ECD to allow Kint to be unwrapped. Once the ECD has been served, or has accessed, all the required information (including Kext) necessary to calculate the MEK, the ECD calculates the MEK and then is capable of decrypting existing ciphertext to produce the resultant cleartext (e.g. in response to a Host Read), or encrypting newly received customer data in cleartext form to ciphertext (e.g. in response to a Host Write).

In one approach, Kint is internally generated and is wrapped with either a KEK or with the PIN associated with some Administrative Security Provider (hereafter "AdminSP") role, e.g. Admin1. Kint can thus be accessed once the KEK is injected into the ECD or the entity such as Admin1 has authenticated with its password or PIN.

The KEK or PIN which wraps Kint may be allowed to change as part of a rekey (of the wrapping key) operation. Kint itself may also be rekeyed, but this would result in crypto-erasure of data encrypted by the MEKs that have been created from the Kint in use before the Kint was rekeyed.

One implementation includes having the ECD be the source of the generation of the Kints in some or all cases using the same type of internal random number generation capability that is invoked for example by the Random command.

Figure 6:
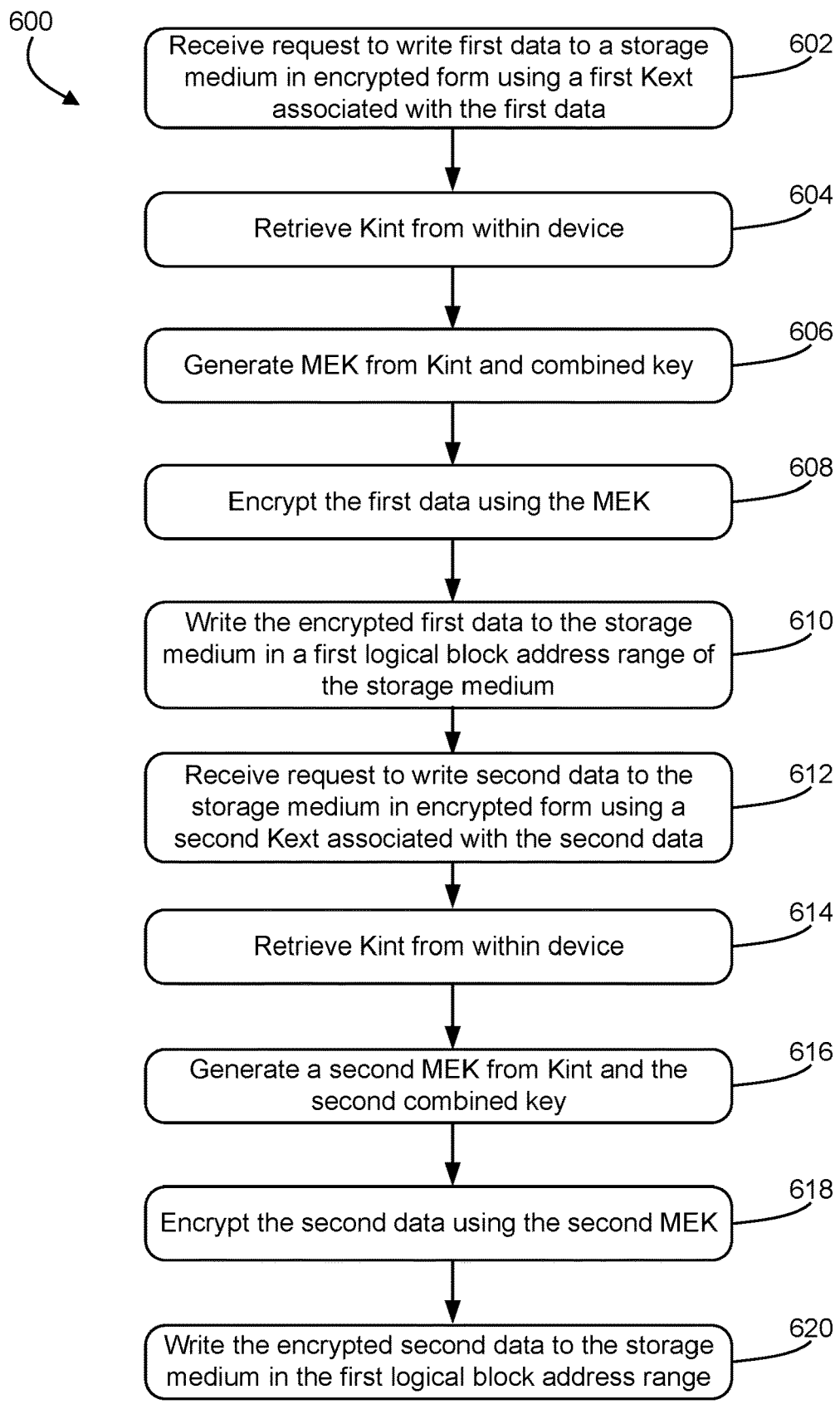
FIG. 6 is a flowchart of a method, in accordance with one aspect of the present invention.

Now referring to FIG. 6, a flowchart of an exemplary method 600 for writing crypto-erasable data in a Key per IO scheme is shown according to one approach. The method 600 may be performed in accordance with the present invention in any of the environments depicted in the other FIGS, described herein, especially FIG. 5, among others, in various approaches. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various approaches, the method 600 may be partially or entirely performed by a device such as a computer, a drive, or some other device having one or more processors therein. The processor, e.g. processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

In operation 602, a request is received at a device configured to perform KPIO-X operations on a storage medium. The request is to write first data to the storage medium in encrypted form using a first Kint associated with the first data.

In operation 604, a Kint stored within the device is accessed.

In operation 606, a first MEK is generated using Kint and the combined key created from Kext and a type key.

In operation 608, the first data is encrypted using the first MEK.

In operation 610, the encrypted first data is written to the storage medium in a first logical block address range of the storage medium. The first logical block address range is preferably the allowed range of logical blocks (e.g. in the NVMe namespace) of the storage medium, which may be millions of sectors long. This is not to be confused with the limited range of the specific write command which is all associated with a single Kext.

In operation 612, a second request is received at the device. The second request is a request to write second data to the storage medium in encrypted form using a second external key associated with the second data, where the second external key is different than the first external key.

In operation 614, the internal key stored within the device is accessed.

In operation 616, a second MEK is generated using the internal key and a second combined key created using a Kext and a type key.

In operation 618, the second data is encrypted using the second MEK.

In operation 620, the encrypted second data is written to the storage medium in the first logical block address range of the storage medium. The second write could be to any logical block address range in the allowed range of logical blocks (e.g. in the NVMe namespace) which may or may not overlap with range of logical blocks written by the first write command.

Additional operations may be performed in this method 600, and any of the features described herein can be implemented in the method 600.

Figure 7:
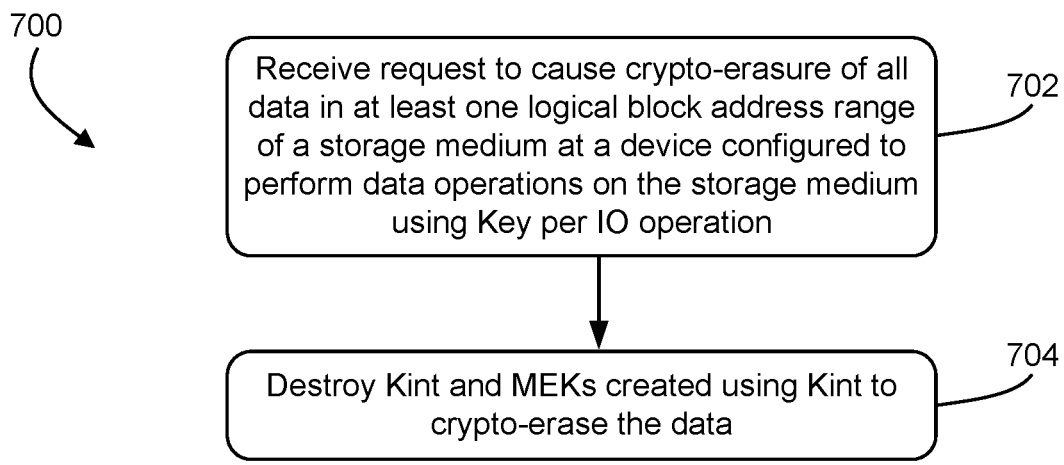
FIG. 7 is a flowchart of a method, in accordance with one aspect of the present invention.

Now referring to FIG. 7, a flowchart of an exemplary method 700 for performing crypto-erase on data in a Key per IO scheme is shown according to one approach. The method 700 may be performed in accordance with the present invention in any of the environments depicted in the other FIGS. described herein, especially FIGS. 4-5, among others, in various approaches. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various approaches, the method 700 may be partially or entirely performed by a device such as a computer, a drive, or some other device having one or more processors therein. The processor, e.g. processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

In operation 702, a request to cause crypto-erasure of all data in at least one logical block address range of a storage medium is received at a device configured to perform data operations on the storage medium using Key per IO operation. Individual portions of the data in the at least one logical block address range are each associated with a unique Kext, e.g. corresponding to unique tenants and/or a unique type key, e.g. corresponding to unique data types. The individual portions of the data are each encrypted using a unique MEK created using a Kint and the unique combined key associated with the portion of the data.

In operation 704, the crypto-erase is achieved by destroying both Kint (e.g. by erasing Kint, overwriting Kint, and/or physically destroying a memory storing Kint) and any MEK(s) in the device created from that Kint.

Examples of Key Types and Corresponding Parameters

The following description provides exemplary configurations and parameters of various types of keys mentioned herein. Any combination of the features below may be used in conjunction with and/or applied to any of the corresponding keys described above. Tenant Keys (or Kext)

In some approaches, one key per tenant is allowed by the first set of address bits, possibly minus one to allow a null setting (e.g. if there are 12 bits in that first set of address bits, there is support for 4095 tenants).

In some approaches, after power up, all tenant keys required are always served to the KPIO-X compliant ECD from some external key manager and are never stored in cleartext form in nonvolatile memory. As an option, the tenant keys may be sent in wrapped form.

In some approaches, the external (to the ECD) key managing entity is in charge of being able to crypto-erase all data associated with a given tenant by causing it to be destroyed both in the ECD (by issuing commands to it) and in all external key stores.

In some approaches, a given tenant key is not persistently associated with any given setting of the first set of address bits. As an example, the external (to the ECD) key managing entity (e.g. key manager) may first serve a given tenant key (e.g. for TenantX) to the ECD as the fifth key (and so it may be associated with a KeyID setting of the first 12 bits of 000000000101). But then, if TenantX's key is not being used for some time (e.g. overnight, when the tenant is not working), that key manager may overwrite that key location with TenantY's key, and later, when TenantX is back at work and wants access to TenantX's data, TenantX's key is sent to a completely different key location (e.g. associated with a KeyID setting of 000101100010).

In some approaches, a given Tenant's data is not statically assigned to any given address range in the common name space. Each time a tenant goes to write data, the write may be dynamically allocated. For example, assume TenantY has recently deleted some logical entity (e.g. a file) that maps to a set of sectors in the address range of the common name space which still has TenantY's ciphertext written to them. Now, TenantX would like to write some logical entity. Space is dynamically allocated to TenantX's data and so TenantX ciphertext may overwrite some or all of the sectors that had previously held TenantY ciphertext and that was released in response to TenantY deleting the file. A process, external to the ECD, may manage which tenant and type key are associated with which set of sectors, so that when there is a need to read those sectors, the correct KeyIDs for both the tenant and type keys are sent with the Host Read command to allow that ciphertext to be decrypted.

Type Keys

In some approaches, one key per type is allowed by the second set of address bits, possibly minus one to allow a null setting (so if there are 4 bits in that second set of address bits, support for 15 types).

In some approaches, after power up, all type keys required are always served to the KPIO-X compliant ECD from some external key manager and are never stored in cleartext form in nonvolatile memory (which would be in violation of the KPIO specification—and presumably of the KPIO-X specification as well). Preferably, the type keys are sent to the ECD in wrapped form.

In some approaches, the external (to the ECD) key managing entity is in charge of being able to crypto-erase all data associated with a given type by causing it to be destroyed both in the ECD (by issuing commands to it) and in all external key stores.

In some approaches, a given type key is not necessarily persistently associated with any given setting of the second set of address bits. As an example, the external (to the ECD) key managing entity (e.g. key manager) may first serve a given type key (e.g. for TypeX) to the ECD as the fifth key (and so it may be associated with a KeyID setting of the second 4 bits of 0101). But then, if TypeX's key is not being used for some time (e.g. a project has been terminated), that key manager may overwrite that key location with TypeY's key, and later, if that project is resumed and so TypeX is needed again and wants access to the data, TypeX's key may be sent to the some completely different key location (e.g. associated with a KeyID setting of 0010).

In some approaches, a given Type's data may or may not be statically assigned to a given address range in the common name space. Each time a tenant goes to write data, the assumption may be that it is dynamically allocated. For example, assume TenantY has written something of TypeA, but has since then deleted some logical entity (e.g. a file) that maps to some set of sectors in the address range of the common name space which still has TenantY's ciphertext written to them. Now TenantY would like to write some other logical entity, e.g. of TypeB. Space is dynamically allocated to TenantY's TypeB data and so TenantY TypeB ciphertext may overwrite some or all of the sectors that had previously held TenantY TypeA ciphertext that was released when TenantY deleted that file of TypeA data. A process, external to the ECD, may manage which tenant and type key are associated with which set of sectors so that when there is a need to read those sectors the correct KeyIDs for both the tenant and type keys are sent with the Host Read command to allow that ciphertext to be decrypted.

Internal Key

In some approaches, one Internal Key may be allocated per namespace. Alternately, one common Internal Key may be used with all namespaces supported by a given ECD.

In some approaches, after each power up followed by unlock of the ECD, the wrapped Internal Key is unwrapped and so is then accessible. Preferably, the Internal Key is never stored nonvolatilely in cleartext form.

In some approaches, the external (to the ECD) entity that is in charge of managing the state of the ECD may, in some circumstances, issue the commands necessary to have the ECD revert itself to its Original Factory State (OFS)—and when it does the ECD is configured to overwrite or otherwise actively delete any wrapped key structures containing the Internal Key as well as any cleartext version of the Internal Key which may be in volatile memory.

In some approaches, a new Internal Key is internally generated within the ECD each time a namespace is created (or perhaps only once after the drive is initialized after it was reverted back to OFS, regardless of however many namespaces are created thereafter (e.g. if the ECD is capable of maintaining more than one namespace)).

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various approaches, the practical application or technical improvement over technologies found in the marketplace, or to enable others of ordinary skill in the art to understand the approaches disclosed herein.

What is claimed is:

1. A device-implemented method, comprising:
    receiving a command having an address field of predefined length, wherein a first subset of bits in the address field identify an external key of a particular tenant, wherein a second subset of the bits in the address field corresponds to one of a plurality of type keys associated with different data types;
    retrieving the external key identified by the first subset of bits;
    retrieving the type key corresponding to the second subset of bits; and
    combining the tenant and type keys to create a combined key for use in encrypting and/or decrypting data associated with the command.

2. The device-implemented method of claim 1, wherein the data types include privacy types.

3. The device-implemented method of claim 1, wherein the data types include confidentiality types.

4. The device-implemented method of claim 1, wherein the command is a Non-Volatile Memory Express (NVMe) compliant command.

5. The device-implemented method of claim 1, wherein the device is configured as a Key per IO-enabled device.

6. The device-implemented method of claim 1, comprising:
    accessing an internal key stored within the device;
    generating a unique media encryption key using the internal key and the combined key; and
    using the media encryption key to encrypt and/or decrypt data associated with the command.

7. The device-implemented method of claim 6, wherein the device is configured to prohibit transfer of the internal key in any form to outside of the device.

8. The device-implemented method of claim 1, wherein several external keys are individually associated with unique data stored at different locations in a same logical block address range.

9. The device-implemented method of claim 1, comprising performing crypto-erase of all data corresponding to the tenant by destroying the external key used by the tenant.

10. The device-implemented method of claim 1, comprising performing crypto-erase of a particular type of data for all tenants by destroying the type key associated with the particular type of data.

11. The device-implemented method of claim 10, wherein the type key is only stored on the device, wherein the device is configured to prohibit transfer of the type key in any form to outside of the device.

12. The device-implemented method of claim 1, wherein a null sequence in the second subset of bits indicates setting and/or deletion of the external key.

13. The device-implemented method of claim 1, wherein the type keys are generated external to the device.

14. The device-implemented method of claim 1, wherein the type keys are generated within the device and stored only in the device.

15. A system, comprising:

a Key per IO-enabled device, the device having a hardware processor and logic integrated with the processor, executable by the processor, or integrated with and executable by the processor, the logic being configured to cause the device to:

receive, by the device, a command having an address field of predefined length, wherein a first subset of bits in the address field identify an external key of a particular tenant, wherein a second subset of the bits in the address field corresponds to one of a plurality of type keys associated with different data types;

retrieve, by the device, the external key identified by the first subset of bits;

retrieve, by the device, the type key corresponding to the second subset of bits; and combine, by the device, the tenant and type keys to create a combined key for use in encrypting and/or decrypting data associated with the command.

16. A computer program product, the computer program product comprising one or more computer readable storage media, and program instructions collectively stored on the one or more computer readable storage media, the program instructions comprising:

program instructions to receive a command having an address field of predefined length, wherein a first subset of bits in the address field identify an external key of a particular tenant, wherein a second subset of the bits in the address field corresponds to one of a plurality of type keys associated with different data types;

program instructions to retrieve the external key identified by the first subset of bits;

program instructions to retrieve the type key corresponding to the second subset of bits; and program instructions to combine the tenant and type keys to create a combined key for use in encrypting and/or decrypting data associated with the command.

17. The computer program product of claim 16, wherein the data types include data types selected from the group consisting of: privacy types and confidentiality types.

18. The computer program product of claim 16, wherein the command is a Non-Volatile Memory Express (NVMe) compliant command.

19. The computer program product of claim 16, wherein a device that executes the program instructions is configured as a Key per IO-enabled device.

20. A device-implemented method, comprising:

generating a command having an address field of predefined length, wherein a first subset of bits in the address field identify an external key of a particular tenant, wherein a second subset of the bits in the address field corresponds to one of a plurality of type keys associated with different data types; and sending the command to a Key per IO-enabled device configured to encrypt and/or decrypt data associated with the command using a combined key generated from the external key and the type key associated with the second subset of the bits.

21. The device-implemented method of claim 20, wherein the data types include privacy types.

22. The device-implemented method of claim 20, wherein the data types include confidentiality types.

23. The device-implemented method of claim 20, wherein the command is a Non-Volatile Memory Express (NVMe) compliant command.

24. The device-implemented method of claim 20, comprising requesting crypto-erase of all data corresponding to the tenant by requesting destruction of the external key stored in the Key per IO-enabled device.

25. The device-implemented method of claim 20, comprising requesting crypto-erase of a particular type of data for all tenants by requesting destruction of the type key associated with the particular type of data.

* * * * *